Figure 1:
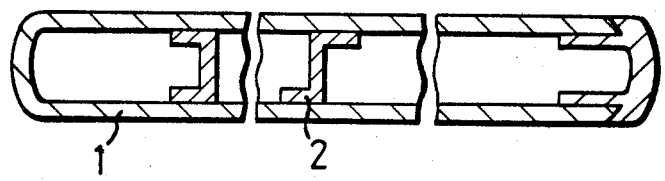

United States Patent [19]
Curnow

[11] Patent Number: 4,585,683
[45] Date of Patent: Apr. 29, 1986

[54] STRUCTURAL PANEL

[75] Inventor: Richard D. Curnow, Chipping Sodbury, England

[73] Assignee: Bristol Composite Materials Engineering Ltd., Bristol, England

[21] Appl. No.: 676,269

[22] Filed: Nov. 29, 1984

[51] Int. Cl.⁴ .......................... B32B 3/26; B32B 5/32
[52] U.S. Cl. .......................... 428/71; 428/76; 428/246; 428/247; 428/316.6; 428/318.4; 428/319.1; 428/319.3; 428/911
[58] Field of Search ............ 428/71, 76, 316.6, 318.4, 428/319.1, 319.3, 246, 247, 911

[56] References Cited

U.S. PATENT DOCUMENTS

| | | | |
|---|---|---|---|
| 3,536,575 | 10/1970 | Maitrot | 428/317.9 |
| 3,671,355 | 6/1972 | Paymal | 428/319.1 |
| 3,785,913 | 1/1974 | Hallamore | 428/71 |
| 3,813,281 | 5/1974 | Burgess et al. | 428/911 |
| 4,361,613 | 11/1982 | Bogner et al. | 428/316.6 |
| 4,476,183 | 10/1984 | Holtrop et al. | 428/316.6 |

FOREIGN PATENT DOCUMENTS 2391334  1/1979  France .............................. 428/319.3

Primary Examiner—William J. Van Balen
Attorney, Agent, or Firm—Morgan, Finnegan, Pine, Foley & Lee

[57] ABSTRACT

A structural panel having a core of a phenolic foam plastics material surrounded by a woven fibre cloth impregnated with a phenolic resin. In the case of large panels, internal stiffeners may be used to improve the structural rigidity. Also the panels may have an armour layer to give the panel bullet and fire resisting properties. The armour layer may be external or internal to the panel and may be for example an alumina or a ceramic tile.

5 Claims, 3 Drawing Figures

STRUCTURAL PANEL

The present invention relates to a structural panel and more particularly relates to fire resisting structural panels.

It is important that offshore structures such as drilling rigs etc have a high resistance to fire. The usual type of structures used in marine fields e.g. boat hulls, are fabricated from composite materials e.g. resin/fibre glass which are not in general fire resisting.

The present invention relates to an improved structural panel which is lightweight, corrosion resistant, and has good fire resisting properties.

Thus according to the present invention there is provided a structural panel comprising a core of a phenolic foam plastics material surrounded by a woven fibre cloth impregnated with a phenolic resin.

In the case of large panels, internal stiffeners may be used to improve the structural rigidity.

Also the panels may have an armour layer to give the panel bullet and fire resisting properties. The armour layer may be external or internal to the panel and may be for example an alumina or a ceramic tile.

The woven fibre cloth is preferably fibre glass and is impregnated with a phenolic resin. Preferably a plurality of layers of woven fibre cloth and resin are laid up and placed together to form a laminate.

In the preferred use, a phenolic foam is used for the core and a phenolic resin is used with the woven fibre cloth so as to produce a structural panel which, under conditions of fire, has low smoke emission and reduced toxic combustion products in comparison to say structural panels produced from polyurethane foams and epoxy or polyester resins.

The woven fibre cloth is preferably made from woven glass fibre. A structural panel formed from the woven product tends to have greater strength and stiffness than a panel formed from the chopped fibre product and is useful for protective armour applications where high resistance to ballistic projectiles is required.

In insulation applications, it is preferred to incorporate a layer of mineral wool or a combination of a mineral wool or foam into the structural panel.

Structural panels according to the invention may be used in varying sizes for fire wall installations on oil rigs, fire doors, for oil rigs, chemical plant, factories and any other situation requiring fire protection.

Some typical dimensions for a structural panel are a thickness of the order of 25–50 mm and a panel size of 1 meter by 2 meters.

Figure 2:
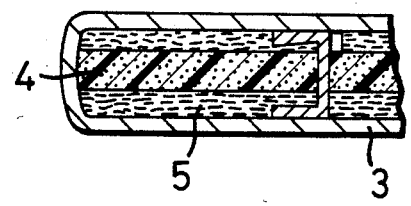

The invention will now be described by way of example only and with reference to FIGS. 1 to 3 of the accompanying drawings, which show vertical cross sections of part of the structural panels.

In use a portion of glass cloth (Marglass M226 woven roving fabric) is impregnated with phenolic resin (J22005-BP chemicals) by dipping in a bath. the solvents in the resin are then allowed to evaporate and the cloth is heated at 100° C. to obtain a tacky surface. The resin impregnated cloth is then cut to shape and the desired number of laminations are laid up and placed together. A similar shaped piece of phenolic foam ("Koolphen" Kooltherm Limited) is positioned against the laminates and a second layer of laminates are laid on top of the foam to produce a sandwich structure. The sandwich structure is then cured for about 60 minutes at 150° C. under 15 psi pressure. If necessary, stiffeners can be inserted into the foam and cloth during the process. It is desirable to stagger the internal stiffners relative to each other so as to reduce heat transfer. FIG. 1 shows a cross section through a structural panel 1 in which stiffeners 2 are incorporated.

If required, for instance an application where thermal insulation is required, outer skins 3 of resin cloth may be used to sandwich a central core of foam 4 with an intermediate layer of mineral wool 5 or mineral wool and foam between the foam 4 and skins 3. A cross section through a structural panel having this configuration is shown in FIG. 2.

Figure 3:
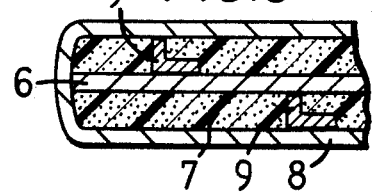

FIG. 3 shows a cross section through a bullet and fire resisting panel comprising a central layer 6 of ceramic tiles or alumina surrounded by a core 7 of phenolic foam and having an outer layer 8 of glass rove cloth and phenolic resin and having stiffeners 9.

I claim:

1. Structural panel comprising (a) a central layer of an armour material (b) said central layer being bonded between layers of a phenolic foam plastics material (c) said phenolic foam plastics material having internal stiffeners so as to increase the rigidity of the panel and (d) a woven fibre cloth impregnated with a phenolic resin, said woven fibre cloth surrounding a major part of the surface of the foam plastics material.

2. Structural panel according to claim 1 in which the woven fibre cloth is fibre glass.

3. Structural panel according to claim 1 or claim 2 in which a plurality of layers of the woven fibre cloth and resin are laid up and placed together to form a laminate.

4. Structural panel according to claim 1 in which the internal stiffeners are in a staggered arrangement relative to each other.

5. Structural panel according to claim 1 in which the armour material comprises alumina or ceramic tiles.

* * * * *